(12) United States Patent
Ohsawa

(10) Patent No.: US 7,071,632 B2
(45) Date of Patent: Jul. 4, 2006

(54) DISCHARGE LAMP STARTER

(75) Inventor: Takashi Ohsawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 637 days.

(21) Appl. No.: 10/133,438

(22) Filed: Apr. 29, 2002

(65) Prior Publication Data

US 2003/0080695 A1    May 1, 2003

(30) Foreign Application Priority Data

Oct. 30, 2001    (JP)    ............... 2001-332891

(51) Int. Cl.
   *H05B 37/00*    (2006.01)
   *H05B 37/02*    (2006.01)

(52) U.S. Cl. ............... 315/276; 315/244; 315/291; 363/21.12

(58) Field of Classification Search ........... 315/244, 315/246, 276, 282, 283, 291, 354, 356, 209 R; 215/DIG. 5
See application file for complete search history.

(56) References Cited

U.S. PATENT DOCUMENTS 5,138,236 A * 8/1992 Bobel et al. ............ 315/209 R
5,519,335 A * 5/1996 Thomas ..................... 324/765
5,808,879 A * 9/1998 Liu et al. ..................... 363/17
5,818,703 A * 10/1998 Jacobson ................. 363/21.13
2002/0102958 A1* 8/2002 Buer ........................... 455/296
2003/0086280 A1* 5/2003 Bourdillon ............... 363/21.12
2004/0004439 A1* 1/2004 Zeng et al. ............... 315/39.61
2005/0046364 A1* 3/2005 Lin et al. .................... 318/254

FOREIGN PATENT DOCUMENTS

JP    1-76185    5/1989
JP    1-218357    * 8/1989
JP    11-356046    12/1999

* cited by examiner

*Primary Examiner*—Trinh Vo Dinh
(74) *Attorney, Agent, or Firm*—Sughrue Mion, PLLC

(57) ABSTRACT

A discharge lamp starter includes a DC/DC converter. The DC/DC converter includes a forward section for producing a first output voltage that is determined by a power supply voltage and a turn ratio of a transformer, and a flyback section for producing a second output voltage that is determined by an inductance of a primary winding of the transformer and a current flowing through the primary winding. The DC/DC converter generates its output voltage by adding the first output voltage and the second output voltage. The configuration can reduce the size of the discharge lamp starter.

11 Claims, 11 Drawing Sheets

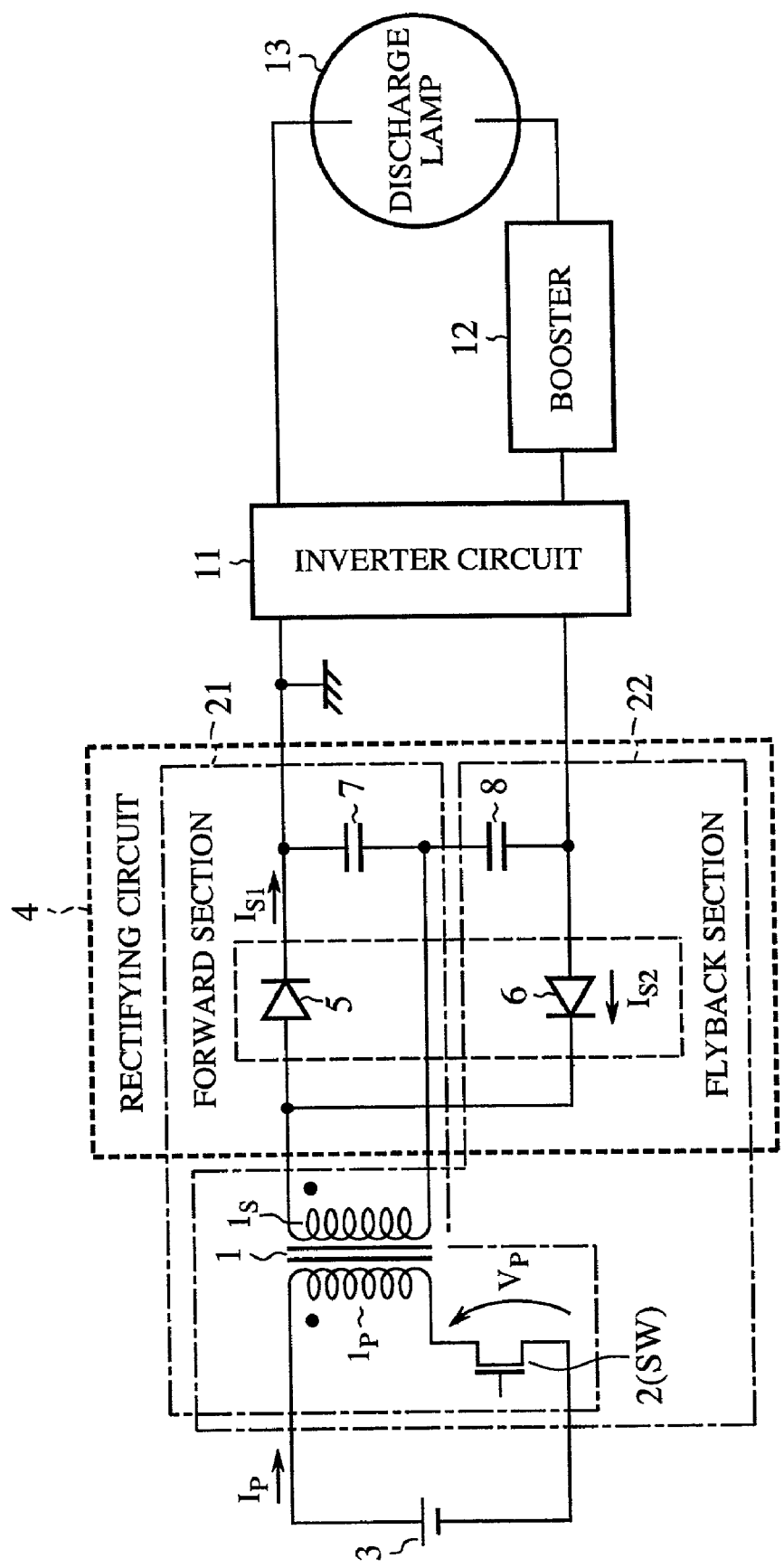

DISCHARGE LAMP STARTER

BACKGROUND OF THE INVENTION

1. Field of the Invention

The present invention relates to a discharge lamp starter for controlling turning on of a discharge lamp used as headlights of a vehicle and the like.

2. Description of Related Art

A conventional DC/DC converter with a flyback function is composed of a simple transformer with a flyback function as shown in FIG. 8. The DC/DC converter has the following configuration. A primary winding 101p of a transformer 101 is connected to a power supply 103 through a switching device (SW) 102, and a secondary winding 101s is connected to a capacitor 105 through a diode 104. The capacitor 105 produces an output voltage $V_s$ across its terminals. In FIG. 8, the reference numeral 106 designates an inverter circuit, and 107 designates a high voltage generator for supplying the discharge lamp 108 with a high voltage.

FIG. 9 is a waveform chart illustrating currents and voltages of various portions to explain the operation of the conventional DC/DC converter. In response to the turning on of the switching device 102, a primary current $I_p$ flows through the primary winding 101p, and the voltage $V_P$ across the switching device 102 is brought to zero. Thus, the core of the transformer stores magnetic energy $\{(1/2)LI_p^2\}$.

Subsequently, in response to the turning off of the switching device 102, the magnetic energy stored in the core causes a current $I_S$ to flow through the secondary winding 101s, so that the capacitor 105 is charged through the diode 104, and generates the output voltage $V_s$ across its terminals. The output voltage $V_s$ of the flyback DC/DC converter varies in response to the load current, and cannot be determined by its primary voltage $V_P$, primary current $I_p$, and the on-time $T_{ON}$ of the switching device 102. In an ideal case, primary power=secondary power holds as follows.

$$V_s \cdot I_S = V_P \cdot I_p$$

The DC/DC converter with the flyback function is advantageous to a wide range of the voltage and current as shown in FIG. 10: Before lighting the discharge lamp in which no current flows, a high voltage of about 400 V is applied thereto; immediately after the lighting, a low voltage of about 20 V and a large current of about 2.6 A are applied; and during normal lighting, a rated voltage of 85 V and a rated current of 0.4 A are applied. However, it has a problem of having a limit to reduce its size because it requires a rather large transformer core to store its magnetic energy via the primary winding, and to supply the energy to the secondary winding.

On the other hand, a DC/DC converter with a forward function as shown in FIG. 11 has a primary winding 111p of a transformer 111 connected to a power supply 113 through a switching device 112, a secondary winding 111s connected to a capacitor 116 via a diode 114 and a choke coil 115, and a diode 117 connected to the connecting point of the diode 114 and choke coil 115 in parallel with the secondary winding 111s, in which the output voltage $V_s$ appears across the capacitor 116. In FIG. 11, the reference numeral 118 designates an inverter circuit, and 119 designates a high voltage generator for supplying a discharge lamp 120 with a high voltage.

FIG. 12 is a waveform chart illustrating currents and voltages of various portions to explain the operation of the DC/DC converter. The turning on of the switching device 112 causes the primary current $I_p$ to flow through the primary winding 111p, and the secondary current $I_s$ to flow through the secondary winding 111s, with placing the voltage $V_p$ across the switching device 112 at zero volt. On the secondary side, the capacitor 116, which is charged via the diode 114 and choke coil 115, generates the output voltage $V_s$ across its ends.

$$V_s = (N_2/N_1) \cdot D \cdot V_1$$

$$D = T_{on}/(T_{on} + T_{off})$$

where
  $N_1$: number of turns of the primary winding,
  $N_2$: number of turns of the secondary winding,
  $V_1$: voltage of the power supply 113,
  $T_{on}$: on-duration of the switching device 112, and
  $T_{off}$: off-duration of the switching device 112.

Since the transformer 111 of the DC/DC converter with a forward function need not store the magnetic energy in the core, the size of the core can be small. However, to output a high voltage of about 400V, it must increase the number of turns of the secondary winding 111s. For example, to boost the power supply voltage of 12 V to 400 V, the numbers of turns of the two types of the DC/DC converter transformers are as follows:

The transformer of the DC/DC converter with the flyback function: primary winding 7T; and secondary winding 42T.

The transformer of the DC/DC converter with the forward function: primary winding 7T; and secondary winding 233T.

Thus, the latter transformer becomes bulky owing to the large-size secondary winding 111s because both the transformers require the secondary winding with a large diameter to carry a large current of 2.6 A, and the secondary winding 111s is 233/42=15.6 times greater in size than the secondary winding 101s. In addition, since the latter transformer generates a voltage with a large amplitude alternating between 0 V and 400 V across the secondary winding 111s, it is necessary for the choke coil 115a to have a large capacity to smooth the voltage, making it difficult to use the transformer of the DC/DC converter with the forward function as a discharge lamp starter.

As examples of a DC/DC switching power supply that employs the two types of the transformers, there are Japanese patent application laid-open (utility model) No. 1-76185 and Japanese patent application laid-open No. 11-356046. The former is basically a forward type power supply that utilizes the flyback energy residual in the core as an auxiliary power supply. The latter is basically a flyback type constant voltage power supply trying to reduce the size of the core. Thus, they are proposed to as a power supply to recover the residual energy, or as a constant voltage power supply.

SUMMARY OF THE INVENTION

The present invention is implemented to solve the foregoing problems. It is therefore an object of the present invention to provide a discharge lamp starter capable of satisfying the wide output voltage range (85 V during lighting and 400 V before lighting) and the wide output current range (2.6 A immediately after the lighting and 0 A before the lighting) by using a DC/DC converter transformer having both the forward function and flyback function.

According to a first aspect of the present invention, there is provided a discharge lamp starter including a DC/DC converter, the DC/DC converter comprising: a forward section for producing a first output voltage that is determined by a power supply voltage and a turn ratio of a transformer; and a flyback section for producing a second output voltage that is determined by an inductance of a primary winding of the transformer and a current flowing through the primary winding, wherein the DC/DC converter generates its output voltage by adding the first output voltage and the second output voltage.

Here, the forward section and the flyback section may comprise in common the transformer, and a switching device inserted into a primary winding circuit of the transformer; the forward section may further comprise a first diode connected to a secondary winding of the transformer, and a first capacitor connected to the first diode; and the flyback section may further comprise a second diode connected to the secondary winding of the transformer in a polarity opposite to that of the first diode, and a second capacitor connected to the second diode, and wherein the first capacitor and the second capacitor may be connected in series to add the first output voltage and second output voltage.

The first output voltage produced by the forward section may be set at a voltage lower than a start voltage of the discharge lamp.

The first output voltage produced by the forward section may be set at a voltage lower than a rated voltage of the discharge lamp.

The transformer may have its core provided with a gap for adjusting its inductance.

The discharge lamp starter may further comprise a detecting circuit for detecting a minimum value of an oscillation voltage of a primary winding circuit of the transformer, which oscillation voltage is produced when the switching device inserted into the primary winding circuit is turned off, wherein the switching device may be closed in response to a result of detection by the detecting circuit.

A secondary winding of the transformer constituting the forward section may be tapped from an intermediate point of a secondary winding of the transformer constituting the flyback section.

The first diode and the second diode may be contained into one package.

BRIEF DESCRIPTION OF THE DRAWINGS

FIG. 3 is a circuit diagram showing a configuration of an embodiment 2 of the discharge lamp starter in accordance with the present invention;

DETAILED DESCRIPTION OF THE PREFERRED EMBODIMENTS

The invention will now be described with reference to the accompanying drawings.

Embodiment 1

Figure 1:
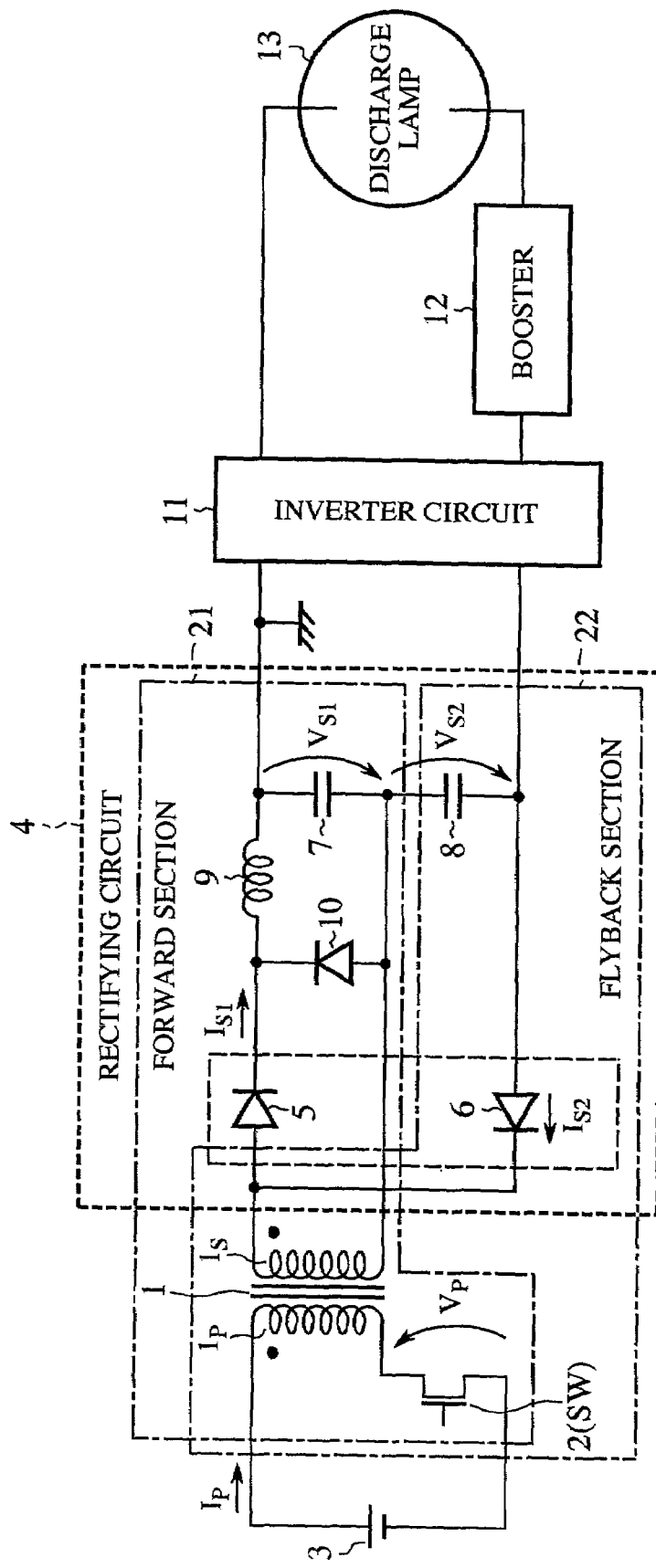
FIG. 1 is a circuit diagram showing a configuration of an embodiment 1 of the discharge lamp starter in accordance with the present invention.

FIG. 1 is a circuit diagram showing a configuration of an embodiment 1 of the discharge lamp starter in accordance with the present invention. In FIG. 1, the reference numeral 1 designates a DC/DC converter transformer with a flyback function and a forward function. Its primary winding 1p is connected to a power supply 3 through a switching device (SW) 2. Its secondary winding 1s is connected to a rectifying circuit 4 with the forward function and flyback function. The rectifying circuit 4 with the forward function and flyback function comprises diodes 5 and 6, capacitors 7 and 8, choke coil 9 for reducing ripples, and a diode 10. The reference numeral 11 designates an inverter circuit which is supplied with a voltage across the capacitors 7 and 8 connected in series, and 12 designates a high voltage generator (booster) for supplying a discharge lamp 13 with a high voltage. Here, the transformer 1, switching device 2, diodes 5 and 10, chock coil 9 and capacitor 7 constitute a forward section 21, and the transformer 1, switching device 2, diode 6, and capacitor 8 constitute a flyback section 22.

The output voltage $V_{s1}$ of the forward section 21 of the DC/DC converter, which is determined by the voltage $V_1$ of the power supply 3 and the turn ratio $N_2/N_1$ of the transformer 1, is set at a value lower than the start voltage (maximum voltage generated during normal lighting) of the discharge lamp. For example, let us assume that the maximum voltage of the discharge lamp is 102 V, and it is obtained by boosting the 12 V of the power supply 3. If the number of turns of the primary winding is seven in this case, the number of turns of the secondary winding becomes 60. Thus, before lighting, the forward section 21 of the DC/DC converter transformer 1 takes charge of 102 V (the maximum voltage specified: the voltage range of the discharge lamp in the normal operation is 85 V±17V), and the flyback section 22 takes charge of the remaining 298 V.

Next, the operation of the present embodiment 1 will be described.

Figure 2:
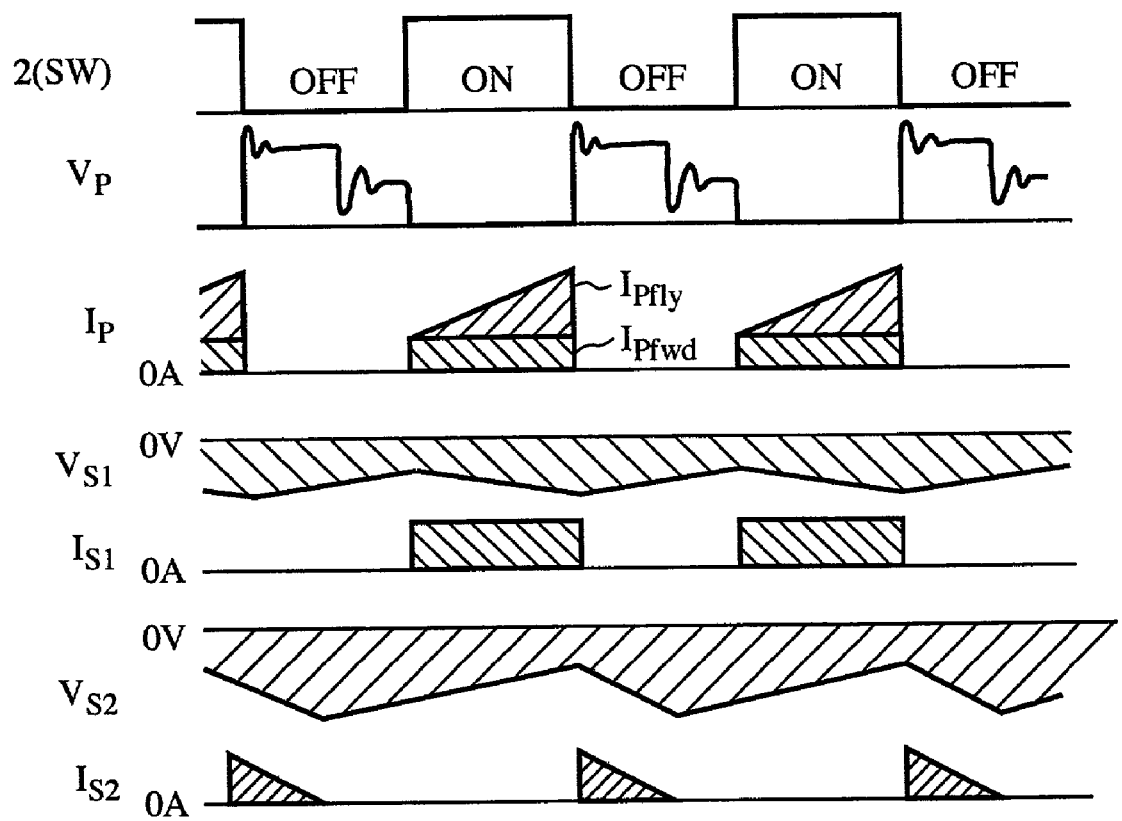
FIG. 2 is a waveform chart illustrating currents and voltages of various portions of the embodiment 1 to explain its operation.

The discharge lamp starter with the configuration as shown in FIG. 1 employs the DC/DC converter transformer 1 with the forward function and flyback function. Thus, when the transistor 2 as the switching device conducts, the forward section 21 generates the secondary voltage $V_{s1}$ by transforming the primary current $I_{pfwd}$ to the secondary current $I_{S1}$ as illustrated in FIG. 2, and at the same time, the flyback section 22 stores the magnetic energy $\{(1/2)LI_{pfly}^2\}$ in the core. Subsequently, when the transistor 2 is tuned off, the flyback section 22 generates the secondary voltage $V_{s2}$ by transforming the magnetic energy to the current $I_{S2}$ flowing through the secondary winding 1s.

As for the forward section 21 of the DC/DC converter, the core of the DC/DC converter transformer 1 is necessary to form an efficient magnetic circuit. As long as the core can accommodate the windings and establish the excitation flux, the core has no problem about its size, and can be made small enough. On the other hand, as for the flyback section 22, the core is used for storing the magnetic energy corresponding to the power difference between the power required by the discharge lamp and the power supplied by the forward section 21 of the DC/DC converter. Therefore, a core smaller than the conventional type can store the magnetic energy.

Let us assume that the voltage of the DC/DC converter transformer 1, which is determined by the voltage $V_1$ of the power supply 3 and the turn ratio of the transformer 1, is set at a value less than the maximum discharge lamp voltage during lighting. For example, it is set at 100 V when the specified maximum voltage is 102 V. During lighting, the forward section 21 takes charge of the voltage 100 V×ON/(ON+OFF) which is determined by the on-duty on the primary side and the turn ratio, whereas the flyback section 22, which includes the excitation power discharge of the forward section 21, takes charge of the remaining voltage.

Before the lighting of the discharge lamp, during which no current flows and the high voltage of about 400 V is applied, the forward section 21 produces the voltage (in this case 100 V which is less than the maximum voltage specified) determined by the voltage $V_1$ of the power supply 3 and the turn ratio of the transformer 1. On the other hand, the flyback section 22 can produce the remaining 300 V because it can generate a high voltage at no load.

An increasing number of turns $N_2$ of the secondary winding of the DC/DC converter transformer 1 will increase the secondary voltage $(N_2/N_1)×V_1=100$ V. It will be necessary in this case to reduce the secondary voltage by decreasing the on-duty of the primary side to obtain the desired secondary voltage. Therefore, the choke coil 9 must have a large inductance to smooth the output. For example, if the turn ratio of the DC/DC converter transformer 1 is determined such that the forward section 21 produces the output $(N_2/N_1)×V_1=400$ V by itself alone, the choke coil 9 must have a large inductance. In other words, decreasing the turn ratio of the transformer can reduce the capacity of the choke coil 9.

As described above, setting the product of the voltage $V_1$ of the power supply 3 and the turn ratio of the transformer 1 at a value less than the discharge lamp voltage during lighting, enables such a configuration that during lighting, the forward section 21 and the flyback section 22 cooperate to supply the power to the discharge lamp, whereas before lighting, the flyback section 22 compensates for the high voltage the forward section 21 cannot supply, thereby making it possible to implement a small size discharge lamp starter.

Furthermore, combining the characteristics of the flyback section 22 and forward section 21 of the DC/DC converter can reduce the ripples of the output because their output timing does not overlap, thereby suppressing the acoustic resonance in the discharge lamp.

Embodiment 2

FIG. 3 is a circuit diagram showing a configuration of an embodiment 2 of the discharge lamp starter in accordance with the present invention. In FIG. 3, the same or like portions to those of FIG. 1 are designated by the same reference numerals, and the description thereof is omitted here. The present embodiment 2 is configured such that the turn ratio of the DC/DC converter transformer 1 with the flyback function and forward function is reduced so that its output voltage is set at a value less than the rated voltage of the discharge lamp. For example, let us assume that the discharge lamp 13 has the rated voltage 85 V, and the transformer 1 has the primary winding of seven and the secondary winding of 35. If the power supply voltage is 12 V, the output voltage of the transformer 1 will be 60 V. Thus, before lighting, the forward section 21 takes charge of 60 V, and the flyback section 22 takes charge of the remaining 340 V.

During normal lighting, the discharge lamp is stabilized at the rated voltage, so that the forward section 21 of the DC/DC converter transformer 1 takes charge of the smoothed 60 V, and the flyback section 22 supplies the remaining 25 V of the output voltage.

Such a configuration makes it possible to eliminate the choke coil and the diode in the forward section 21. More specifically, when the primary side can supply enough voltage to the secondary side, and the smoothing capacitor on the secondary side can store enough voltage for the load voltage, the voltage $V_{s1}=\{(N_2/N_1)×V_1\}$ is established independently of the ON/OFF duty of the primary side. Thus, the smoothing by the choke coil 9 is unnecessary in the present embodiment 2.

In addition, containing the two diodes 5 and 6 constituting the rectifying circuit 4 of the forward section 21 and flyback section 22 into one package in the embodiment 2 can reduce the size and facilitate handling of the device.

Embodiment 3

Figure 4A:
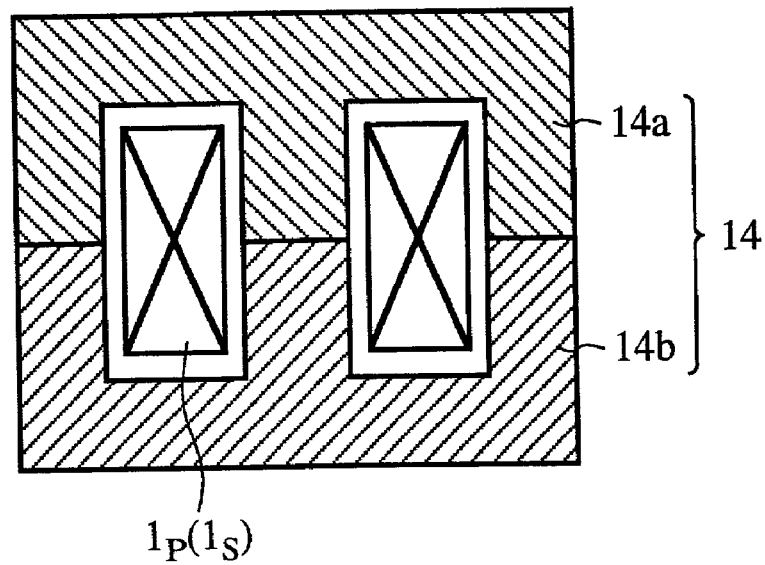
FIGS. 4A and 4B are cross-section views each showing a structure of the core of a DC/DC converter transformer with flyback function and forward function, which constitutes an embodiment 3 of the discharge lamp starter in accordance with the present invention.
Figure 4B:
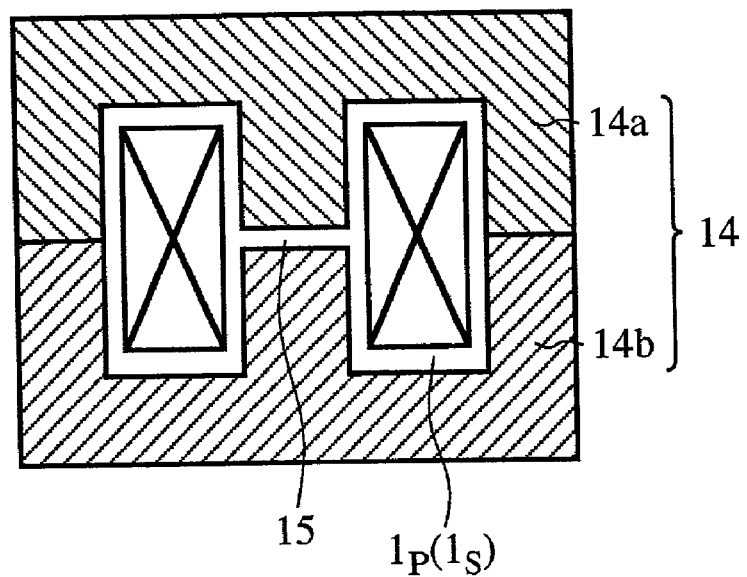

FIGS. 4A and 4B are cross-sectional views showing structures of the core of the DC/DC converter transformer 1 with the flyback and forward functions of an embodiment 3 of the discharge lamp starter in accordance with the present invention. A core 14 consists of an E-like core 14a and an E-like core 14b, which are combined with their opening sides facing to each other. FIG. 4A shows a core of a transformer with the forward function, which has no gaps between the cores. The core will readily vary the inductance depending on its material or geometry. FIG. 4B shows a core of a transformer with the flyback function, which has a gap between the cores to reduce the variations in inductance depending on their material or geometry.

In view of this, the DC/DC converter transformer 1 with the flyback and forward functions in the present embodiment 3 has a gap 15 between the cores.

To construct the transformer with the flyback function, it is necessary to specify the inductance and the current value increasing per unit time, to determine the magnetic energy stored. To suppress the variations in the inductance owing to the variations in the characteristics of the core 14, it is preferable for the core 14 to have the gap 15. This is because the inductance of the secondary winding is determined more easily by adjusting the gap 15 than by changing the number of turns of the DC/DC converter transformer 1.

Embodiment 4

Figure 5A:
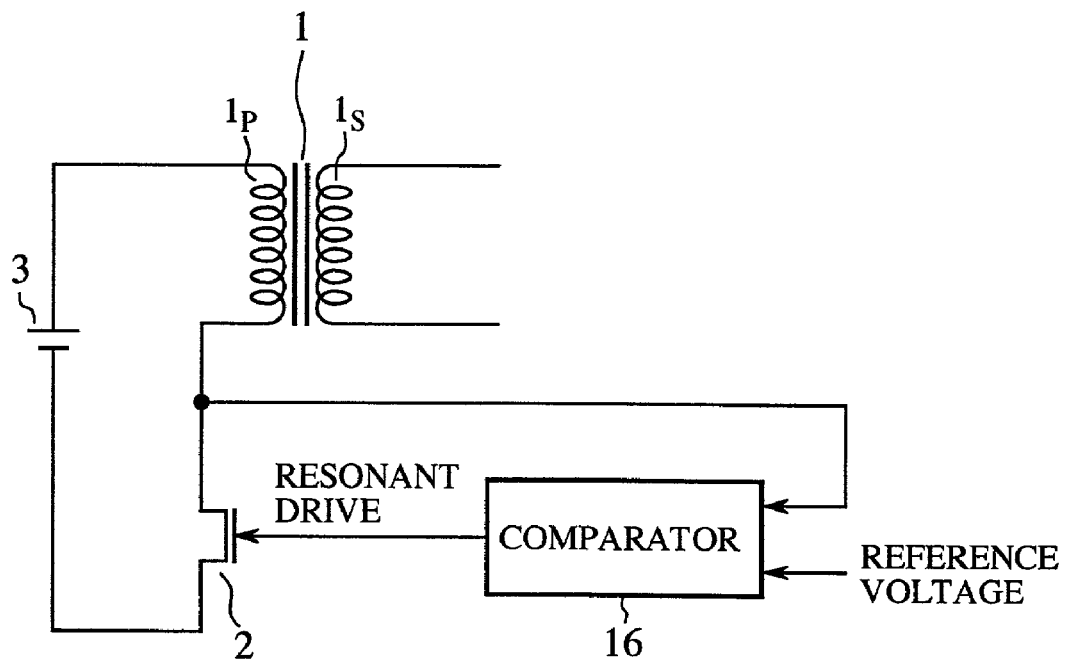
FIG. 5A is a circuit diagram showing a configuration of a main portion of a DC/DC converter transformer with flyback function and forward function, which constitutes an embodiment 4 of the discharge lamp starter in accordance with the present invention.

FIG. 5A is a circuit diagram showing a configuration of a main portion of the DC/DC converter with the flyback section and forward section of an embodiment 4 of the discharge lamp starter in accordance with the present invention. In FIG. 5A, the same or like portions to those of FIG. 1 are designated by the same reference numerals and the description thereof is omitted here. In FIG. 5A, the reference numeral 16 designates a comparator for comparing the voltage at one end of the primary winding 1p with a reference voltage supplied from a control unit not shown, to control the transistor 2.

Next, the operation of the present embodiment 4 will be described.

Figure 5B:
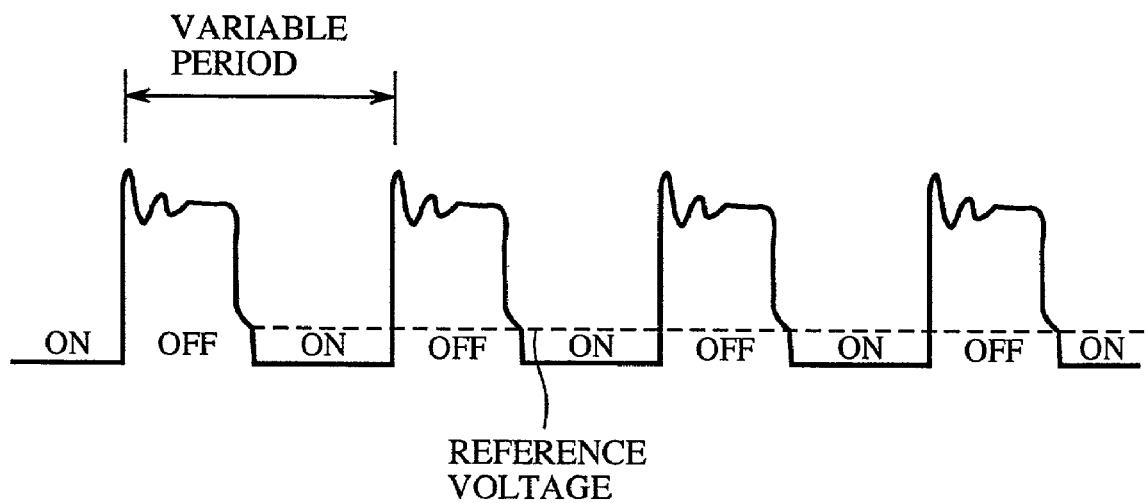
FIG. 5B is a waveform chart illustrating currents and voltages of various portions of the main portion to explain the operation of the embodiment 4.

FIG. 5B is a waveform chart illustrating the primary voltage to explain the operation of the present embodiment 4. As for the flyback section, the transistor 2 is turned off, and turned on again through resonant process due to a small voltage remaining after supplying power to the secondary side. Considering this, in the present embodiment 4, after the transistor 2 is turned off, the comparator 16 detects that the voltage of the primary winding 1p drops below the reference voltage, so that the transistor 2 is turned on in response to the detection. Thus, the transistor 2 is switched from the OFF state to the ON state at a minimum voltage.

Figure 6A:
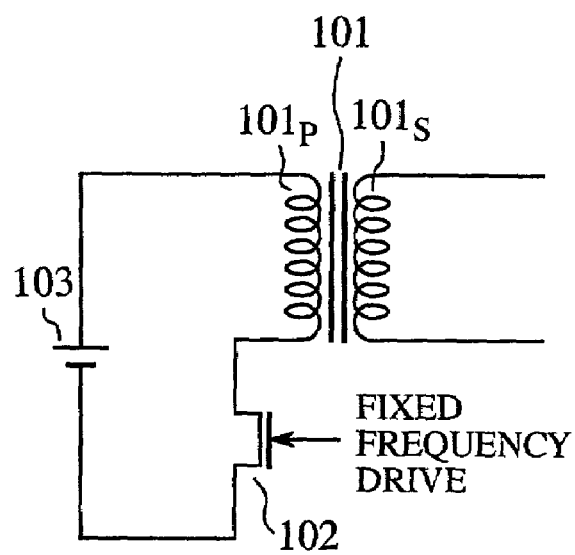
FIG. 6A is a circuit diagram showing a configuration of a main portion of a conventional DC/DC converter transformer corresponding to the circuit as shown in FIG. 5A.
Figure 6B:
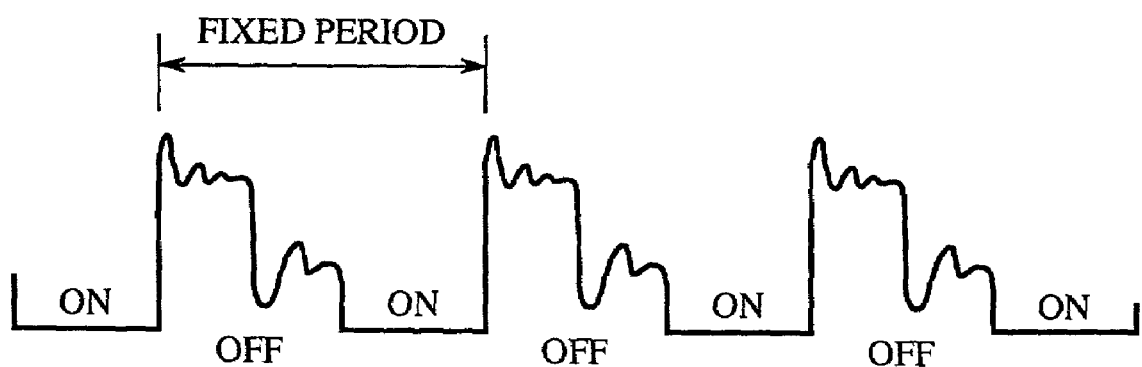
FIG. 6B is a waveform chart illustrating currents and voltages of various portions of the main portion of the circuit as shown in FIG. 6A.

In contrast with this, in the conventional transformer with the flyback function, which is shown in FIG. 6A as comparison, the transistor 2 is driven at a fixed frequency. Accordingly, in the process of switching from the OFF state to the ON state, the transistor 102 can conduct while a high voltage is applied to the transistor because the switching is not synchronized with the resonance, thereby increasing the switching loss of the transistor.

As described above, the present embodiment 4 can turn on the transistor 2 when the applied voltage is low. Thus, it can reduce the switching loss and the noise involved in the switching.

Embodiment 5

Figure 7:
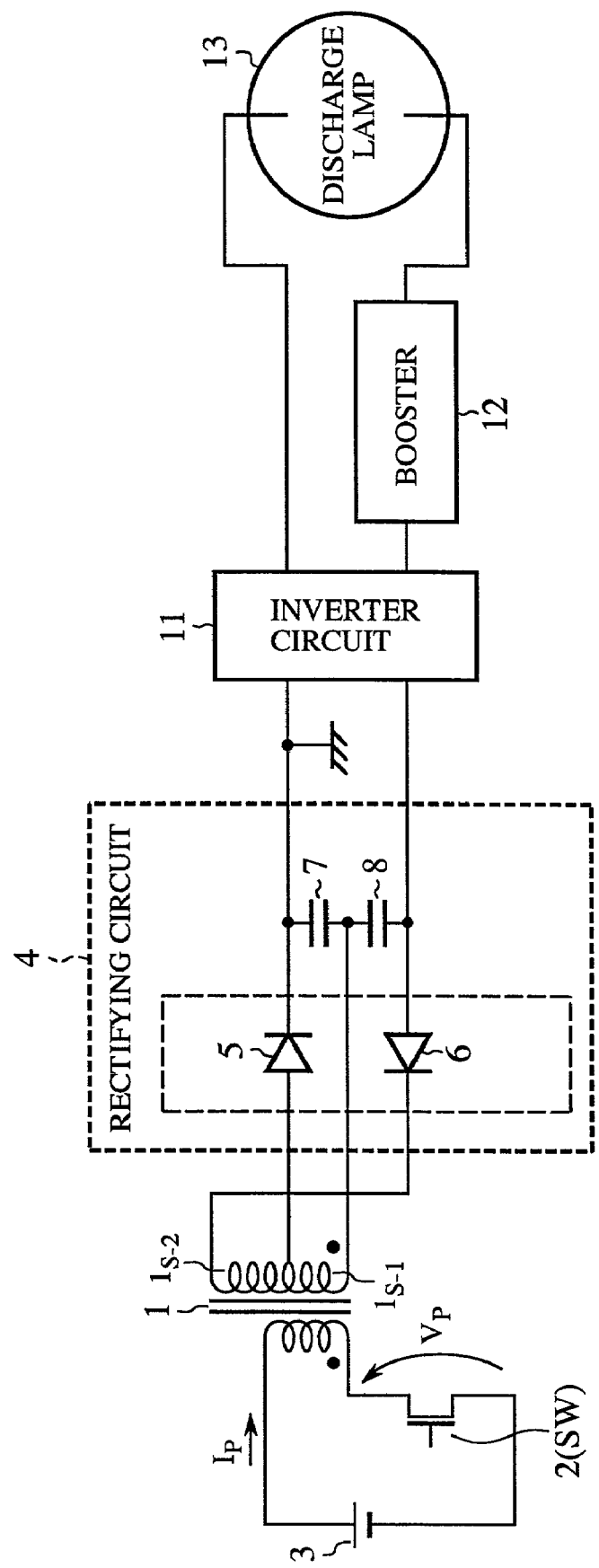
FIG. 7 is a circuit diagram showing a configuration of an embodiment 5 of the discharge lamp starter in accordance with the present invention.
Figure 8:
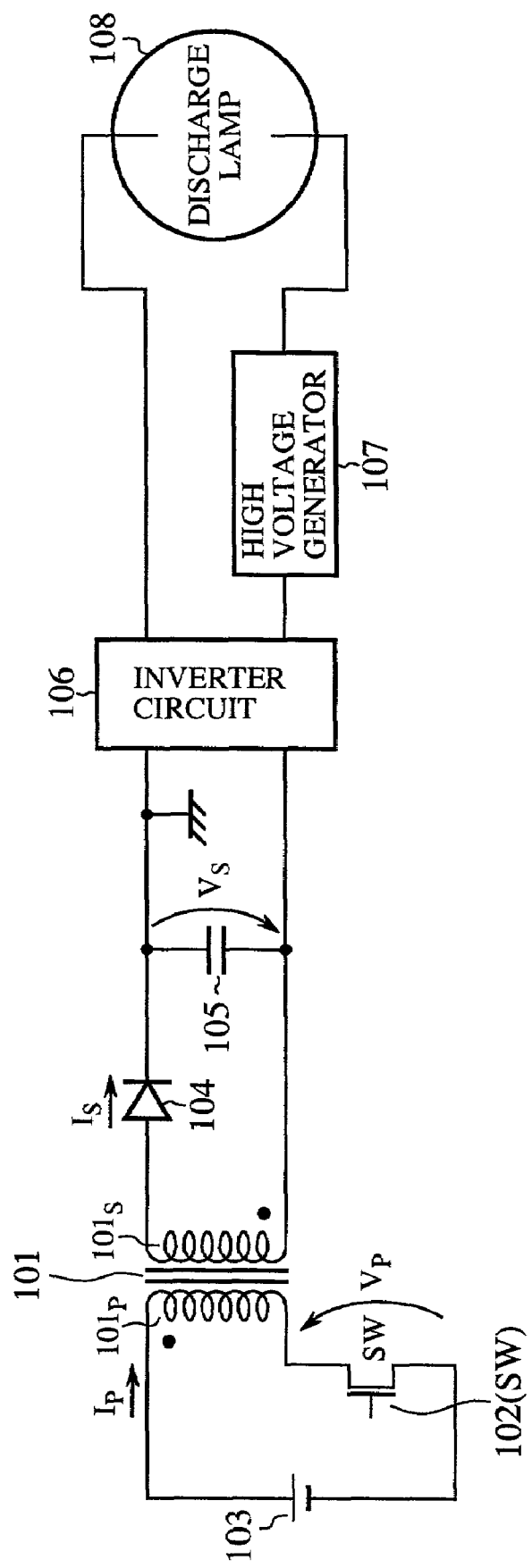
FIG. 8 is a circuit diagram showing a configuration of a conventional discharge lamp starter utilizing a transformer with a flyback function.
Figure 9:
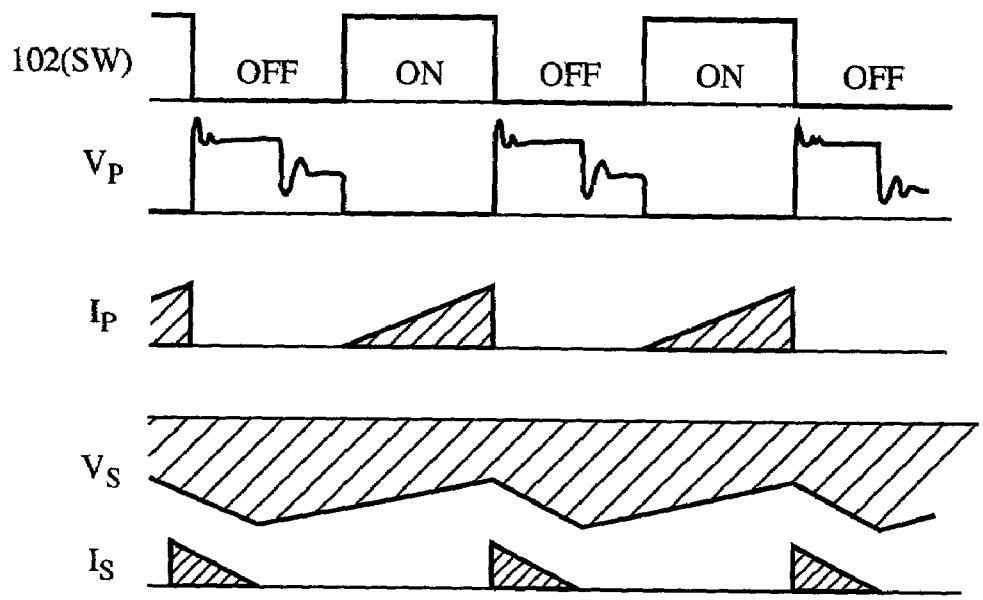
FIG. 9 is a waveform chart illustrating currents and voltages of various portions to explain the operation of the conventional discharge lamp starter of FIG. 8.
Figure 10:
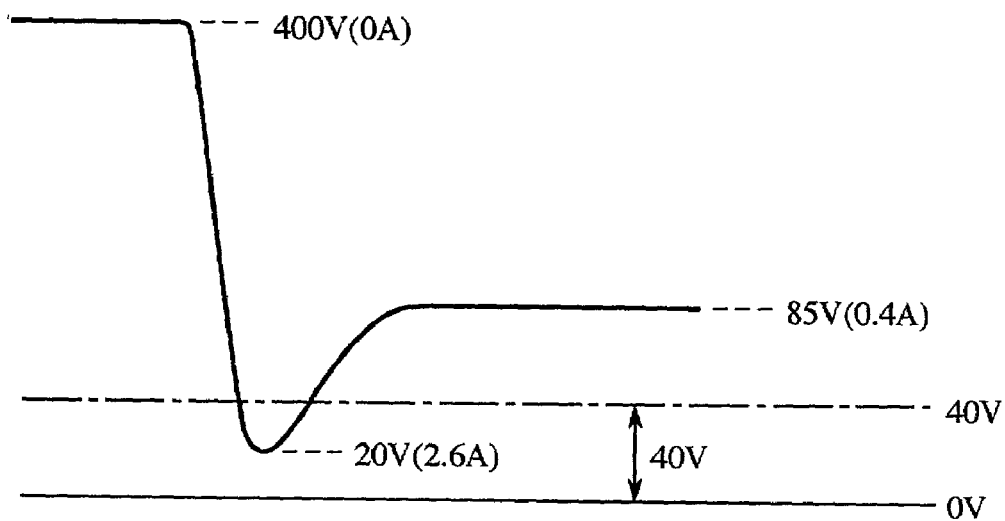
FIG. 10 is a waveform chart illustrating changes in the voltage supplied to a discharge lamp.
Figure 11:
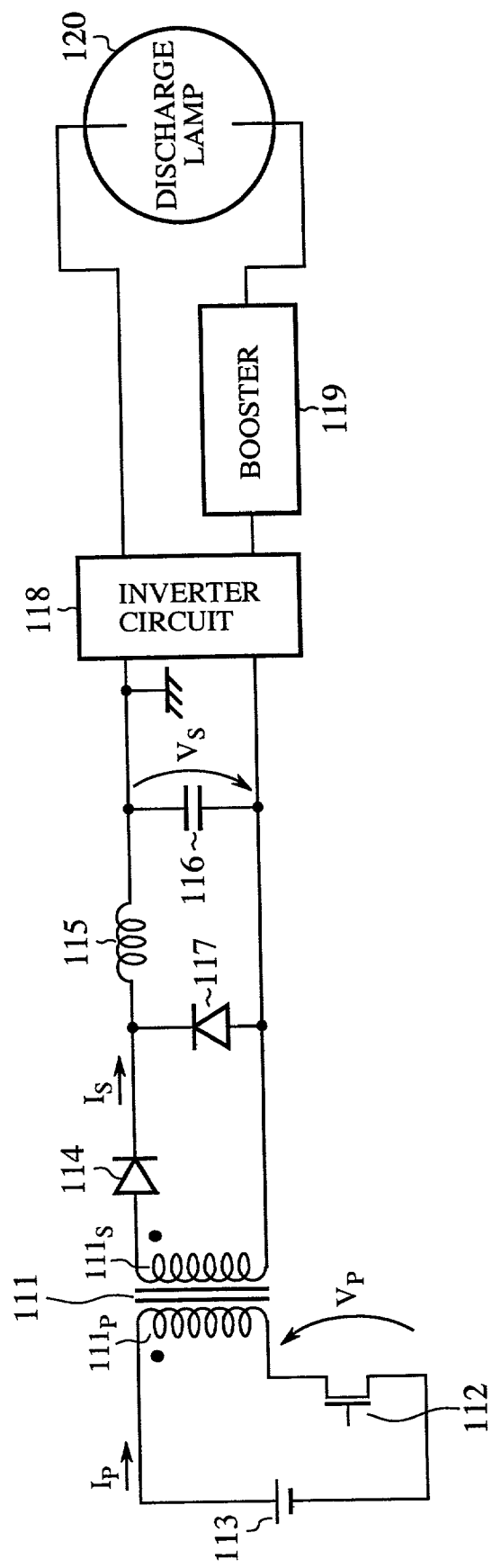
FIG. 11 is a circuit diagram showing a configuration of a conventional discharge lamp starter utilizing a transformer with a forward function.
Figure 12:
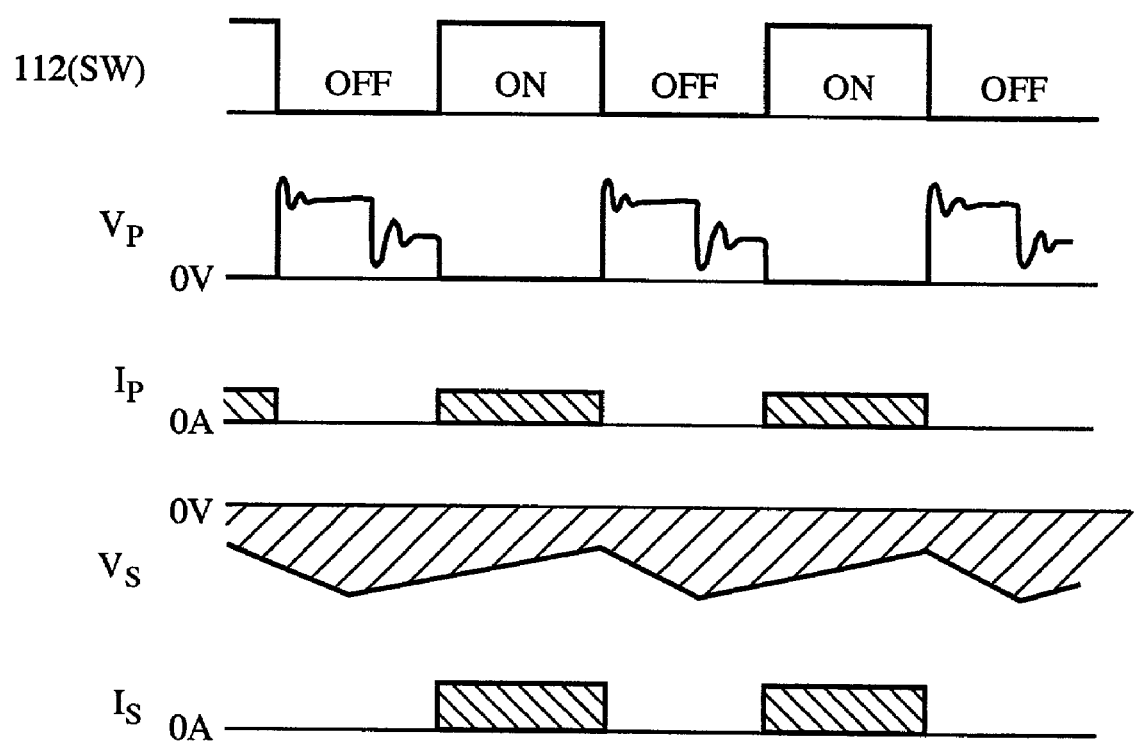
FIG. 12 is a waveform chart illustrating currents and voltages of various portions to explain the operation of the conventional discharge lamp starter of FIG. 11.

FIG. 7 is a circuit diagram showing a configuration of an embodiment 5 of the discharge lamp starter in accordance with the present invention. In FIG. 7, the same or like portions to those of FIG. 1 are designated by the same reference numerals, and the description thereof is omitted here. The present embodiment 5 comprises the DC/DC converter transformer 1 with the forward function that determines the output voltage by the power supply voltage and the turn ratio, and with the flyback function that determines output voltage by the inductance of the primary winding. The secondary winding $1_{S-1}$ of the forward function of the DC/DC converter transformer 1 is tapped at an intermediate point of the secondary winding $1_{S-2}$ of the flyback function.

With the configuration, the flyback section 22 can implement the same turn ratio as the conventional flyback type with maintaining the appropriate turn ratio of the forward section 21. In addition, the transistor 2 as the switching device can have the same withstand voltage as the conventional one. Thus, the present embodiment 5 can reduce the core capacity, and by extension the total size of the discharge lamp starter.

What is claimed is:

1. A discharge lamp starter including a DC/DC converter, said DC/DC converter comprising:
   a forward section for producing a first output voltage that is determined by a power supply voltage and a turn ratio of a transformer; and
   a flyback section for producing a second output voltage that is determined by an inductance of a primary winding of said transformer, a current flowing through the primary winding and a current flowing through a secondary winding,
   wherein said DC/DC converter generates its output voltage by adding the first output voltage and the second output voltage.

2. The discharge lamp starter according to claim 1, wherein said forward section and said flyback section comprise in common said transformer, and a switching device inserted into a primary winding circuit of said transformer; said forward section further comprises a first diode connected to a secondary winding of said transformer, and a first capacitor connected to said first diode; and said flyback section further comprises a second diode connected to the secondary winding of said transformer in a polarity opposite to that of said first diode, and a second capacitor connected to said second diode, and wherein said first capacitor and said second capacitor are connected in series to add the first output voltage and second output voltage.

3. The discharge lamp starter according to claim 2, further comprising a detecting circuit for detecting a minimum value of an oscillation voltage of a primary winding circuit of said transformer, which oscillation voltage is produced when said switching device inserted into the primary winding circuit is turned off, wherein said switching device is closed in response to a result of detection by said detecting circuit.

4. The discharge lamp starter according to claim 2, wherein said first diode and said second diode are contained into one package.

5. The discharge lamp starter according to claim 2, further comprising a detecting circuit for detecting a minimum value of an oscillation voltage of a primary winding circuit of said transformer, wherein said switching device is closed in response to a result of detection by said detecting circuit.

6. The discharge lamp starter according to claim 1, wherein the first output voltage produced by said forward section is set at a voltage lower than a start voltage of a discharge lamp.

7. The discharge lamp starter according to claim 1, wherein the first output voltage produced by said forward section is set at a voltage lower than a rated voltage of said discharge lamp.

8. The discharge lamp starter according to claim 1, wherein said transformer comprises a core provided with a gap for adjusting an inductance of the transformer.

9. The discharge lamp starter according to claim 1, wherein a secondary winding of said transformer constituting said forward section is tapped from an intermediate point of a said secondary winding of said transformer constituting said flyback section.

10. The discharge lamp starter according to claim 1, wherein the primary winding and the secondary winding are disposed so that a polarity of the primary winding match a polarity of the secondary winding.

11. The discharge lamp starter according to claim 1, wherein the primary winding and the secondary winding are disposed so that an orientation of a polarity of the primary winding is the same as an orientation of a polarity of the secondary winding.

* * * * *